(12) United States Patent
Beach et al.

(10) Patent No.: US 8,335,420 B2
(45) Date of Patent: Dec. 18, 2012

(54) HYBRID FIBER-ROD LASER

(75) Inventors: Raymond J. Beach, Livermore, CA (US); Jay W. Dawson, Livermore, CA (US); Michael J. Messerly, Danville, CA (US); Christopher P. J. Barty, Hayward, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 1602 days.

(21) Appl. No.: 11/809,177

(22) Filed: May 30, 2007

(65) Prior Publication Data

US 2012/0287951 A1 Nov. 15, 2012

Related U.S. Application Data

(60) Provisional application No. 60/810,094, filed on May 31, 2006.

(51) Int. Cl.
*G02B 6/02* (2006.01)

(52) U.S. Cl. ......................................... 385/123; 385/124

(58) Field of Classification Search .................. 385/123, 385/124
See application file for complete search history.

(56) References Cited

U.S. PATENT DOCUMENTS

| | | | |
|---|---|---|---|
| 4,185,889 A | 1/1980 | Alianic et al. | |
| 4,782,491 A * | 11/1988 | Snitzer | 372/6 |
| 4,999,504 A * | 3/1991 | Braunlich et al. | 250/484.5 |
| 5,805,754 A | 9/1998 | Zhang | |
| 6,278,816 B1 * | 8/2001 | Keur et al. | 385/29 |
| 6,304,585 B1 * | 10/2001 | Sanders et al. | 372/22 |
| 6,370,422 B1 * | 4/2002 | Richards-Kortum et al. | 600/478 |
| 6,385,380 B1 * | 5/2002 | Friedrich et al. | 385/125 |
| 6,614,975 B2 * | 9/2003 | Richardson et al. | 385/127 |
| 6,704,479 B2 * | 3/2004 | Koplow | 385/31 |
| 6,904,219 B1 | 6/2005 | Fermann | |
| 7,034,992 B2 * | 4/2006 | Komine | 359/334 |
| 7,260,299 B1 * | 8/2007 | Di Teodoro et al. | 385/123 |
| 7,306,376 B2 * | 12/2007 | Scerbak et al. | 385/76 |
| 7,379,648 B1 * | 5/2008 | Brooks et al. | 385/126 |
| 7,400,797 B2 * | 7/2008 | Bhagavatula et al. | 385/32 |
| 7,433,116 B1 * | 10/2008 | Islam | 359/333 |
| 7,437,033 B1 * | 10/2008 | Efimov | 385/36 |
| 7,440,175 B2 * | 10/2008 | Di Teodoro et al. | 359/341.1 |
| 7,782,527 B1 * | 8/2010 | Brooks et al. | 359/341.1 |
| 7,830,596 B1 * | 11/2010 | Di Teodoro et al. | 359/341.1 |
| 7,835,068 B1 * | 11/2010 | Brooks et al. | 359/341.1 |
| 7,835,608 B2 * | 11/2010 | Minelly et al. | 385/126 |
| 7,941,019 B1 * | 5/2011 | Brooks et al. | 385/47 |
| 8,068,231 B2 * | 11/2011 | Digonnet | 356/460 |
| 2002/0018630 A1 * | 2/2002 | Richardson et al. | 385/127 |

(Continued)

OTHER PUBLICATIONS

Mahmoud, Analysis of Longitudinal Mode Waveguiding in VCSELs with Long Monolithic Cavity, Annual Report 2000, Optoelectronics Dept., U. of Ulm.

(Continued)

*Primary Examiner* — K. Cyrus Kianni
(74) *Attorney, Agent, or Firm* — John P. Wooldridge

(57) ABSTRACT

Single, or near single transverse mode waveguide definition is produced using a single homogeneous medium to transport both the pump excitation light and generated laser light. By properly configuring the pump deposition and resulting thermal power generation in the waveguide device, a thermal focusing power is established that supports perturbation-stable guided wave propagation of an appropriately configured single or near single transverse mode laser beam and/or laser pulse.

24 Claims, 3 Drawing Sheets

U.S. PATENT DOCUMENTS

| | | | |
|---|---|---|---|
| 2002/0125228 A1* | 9/2002 | Smart et al. | 219/121.62 |
| 2003/0095263 A1* | 5/2003 | Varshneya et al. | 356/477 |
| 2003/0160254 A1* | 8/2003 | Henrichs | 257/88 |
| 2004/0233941 A1* | 11/2004 | Fajardo et al. | 372/6 |
| 2004/0247272 A1* | 12/2004 | Dawson et al. | 385/127 |
| 2005/0078353 A1* | 4/2005 | Komine | 359/334 |
| 2006/0072875 A1* | 4/2006 | Bhagavatula et al. | 385/30 |
| 2007/0041083 A1* | 2/2007 | Di Teodoro et al. | 359/333 |
| 2007/0091948 A1* | 4/2007 | Di Teodoro et al. | 372/39 |
| 2007/0104431 A1* | 5/2007 | Di Teodoro et al. | 385/123 |
| 2007/0172174 A1* | 7/2007 | Scerbak et al. | 385/76 |
| 2010/0172381 A1* | 7/2010 | Jameson | 372/9 |

OTHER PUBLICATIONS

Tang Sindy et al: "Optical waveguiding using thermal gradients across homogeneous liquids in microfluidic channels", Applied Physics Letters, AIP, 2006.

American Institute of Physics, Melville, NY, US, vol. 88, No. 6, Feb. 8, 2006, pp. 61112-61112, XP012082702.

Guntau M. et al: "Novel method to measure bulk absorption in optically transparent materials", Review of Scientific Instruments, American Institute of Physics, US, vol. 71, No. 6, Jun. 2000, pp. 2279-2282, XP012038321, Feb. 2000.

Siegman, A.E. "Propagating Modes in Gain-guided Optical Fibers", Journal of the Optical Society of America—A, Optical Society of America, Washington, US, vol. 20, No. 8, Aug. 2003. pp. 1617-1628, XP009096393. ISSN: 1084-7529, 2003.

Davis, M.K. et al: "Thermal Effects In Doped Fibers", Journal of Lightwave Technology, vol. 16, No. 6, Jun. 1998, pp. 1013-1023. XP011029146.

* cited by examiner

HYBRID FIBER-ROD LASER

This application claims priority to U.S. Provisional Patent Application Ser. No. 60/810,094, titled: "Hybrid Fiber-ROD Laser (FROD)", filed May 31, 2006, which application is incorporated herein by reference.

The United States Government has rights in this invention pursuant to Contract No. W-7405-ENG-48 between the United States Department of Energy and the University of California for the operation of Lawrence Livermore National Laboratory.

BACKGROUND OF THE INVENTION

1. Field of the Invention

The present invention relates to optical waveguides, and more specifically, it relates to single mode operation of optical waveguides.

2. Description of Related Art

Today the most common fiber structures consist of a single step index that serves to confine radiation as it is propagated along the length of a fiber. By appropriately coordinating the magnitude of the jump in the step index together with the diameter of the laser core, it is possible to ensure only a single transverse mode will be guided by the fiber. FIG. 1 illustrates a prior art fiber structure with a step index 10 and the corresponding irradiance profile of the guided radiation 12.

This is an extremely useful configuration because single transverse mode radiation is very close to being diffraction limited when it leaves the fiber. Diffraction limited light is the highest attainable quality of light for propagating through free space, minimizing diffractive spreading and enabling focusing to the smallest possible spot with the use of a simple lens. The limit on the pulse energy possible in such a waveguide structure is determined by the onset of deleterious nonlinear effects such as stimulated Brillouin scattering, stimulated Raman scattering, self phase modulation, and optical damage to the fiber medium itself. Scaling such structures to larger pulse energy is done by increasing the core area, i.e., the area associated with the step index. Doing this does however require that the height of the step in the index be decreased to ensure the fiber only supports single mode propagation as the core area is grown. The following relation gives the maximum value of the index step, $\Delta n$, that will guarantee single mode operation $$\frac{2\pi}{\lambda_0} a \sqrt{2 \cdot n \cdot \Delta n} < 2.4,$$

where a is the radius of the core. This relation is plotted in FIG. 2A where the maximum value of the step index $\Delta n$ that is permissible for a given structure to remain single mode is plotted against core diameter for the specific case of $\lambda=1.080$ μm and a base index value of n=1.5.

The area 20 in FIG. 2A denotes that portion of the parameter space that is directly accessible by convention single mode fibers. The record core diameter reported today for a step index fiber is 80 μm, although this fiber reportedly had a large $\Delta n$ value of $\sim 1.2 \times 10^{-3}$, permitting the propagation of many modes beyond the preferred diffraction limited one. The practical limit in going to larger core area fibers that are truly single mode is the increased precision with which refractive index control must be incorporated into the waveguide. Using conventional fiber technology, control on the level of $\sim 1 \times 10^{-4}$ is possible, from which one concludes it will not be possible to push single mode fiber waveguides beyond about 50 microns in core diameter.

Single mode waveguides and fibers having core diameters exceeding that attainable with conventional fiber technology are desirable.

SUMMARY OF THE INVENTION

It is an object of the present invention to exploit thermally induced waveguiding by using the thermally formed refractive index profiles that are produced in a fiber like structure under average power excitation.

It is another object to provide a waveguide structure formed of a uniform and homogenous rod shaped optical material with a positive dn/dT and including a laser gain media dopant.

Another object is to provide a pump excitation source configured to establish a transverse thermal gradient in a uniform and homogenous rod shaped optical material with a positive dn/dT that includes a laser gain media dopant and generate gain in the rod.

Still another object is to provide a waveguide structure having a uniform and homogenous rod shaped optical core material with a positive dn/dT and including a laser gain media dopant, and further including a lower refractive index optical material surrounding the core, and still further including a pump excitation source configured to input light into the lower refractive index optical material, establish a transverse thermal gradient in the rod and generate gain in the rod.

An object of the invention is to provide a method for amplifying a beam of light by providing a fiber of optically transmissive material, where the fiber has a central axis and where the optically transmissive material has a substantially uniform index of refraction and a laser gain media dopant, the method further including propagating a pump beam of light along the central axis to produce a thermally formed refractive index profile in the fiber and to produce an optical inversion by optically pumping the dopant, the method still further including propagating a seed beam along the thermally formed refractive index profile, where the seed beam interacts with the optical inversion to produce an amplified output beam.

These and other objects will be apparent based on the disclosure herein.

This invention is motivated and specifically aimed at expanding the parameter space accessible with fiber-like amplifier systems. Specifically, this invention enables pulse energies to be pushed more than an order of magnitude beyond what has now been demonstrated in stable-propagating single mode fiber structures. To accomplish this goal, the invention takes features from both laser fibers and laser rods and combines them in a hybrid device at times referred to herein as a FROD for Fiber-ROD. The invention exploits thermally induced waveguiding by using the thermally formed refractive index profiles that are produced in a fiber like structure under average power excitation. Normally, the existence of such thermally induced refractive index profiles is problematic, but here it is exploited as a useful physical mechanism for the purpose of forming a robust waveguide.

The invention increases the transverse mode area of a single, or near single transverse mode laser waveguide structure by achieving refractive index control well beyond that attainable with conventional fiber fabrication technology. Single, or near single transverse mode waveguide definition is produced using a single homogeneous medium to transport both the pump excitation light and generated laser light. By properly configuring the pump deposition and resulting thermal power generation in the waveguide device, a thermal focusing power is established that supports perturbation-stable guided wave propagation of an appropriately configured single or near single transverse mode laser beam and/or laser pulse. Modeling simulations have shown that this invention enables transverse mode areas in single and near single mode fiber waveguide structures to be increased by a factor of more than 10 beyond what is achievable with conventional fiber technology. This should directly translate to an increase of more than 10 times in fiber pulse energies that can be generated.

Government uses or possibilities for use include (i) scaled power fiber lasers, (ii) laser defense applications, (iii) various materials processing and machining applications, (iv) short pulse laser sources and amplifiers and (v) front end pulse generation and amplification system for the National Ignition Facility (NIF)—and like laser systems.

Commercial or other uses or possibilities for use include (i) transport fiber and fiber laser sources for telecommunication applications, (ii) applications involving active remote sensing, e.g., homeland security, (iii) scaled power fiber lasers, (iv) optical power distribution networks, (v) various materials processing and machining applications, e.g., metal cutting, metal brazing, deep penetration metal welding, plastic welding and soldering and (vi) short pulse laser sources and amplifiers.

BRIEF DESCRIPTION OF THE DRAWINGS

The accompanying drawings, which are incorporated into and form a part of the disclosure, illustrate embodiments of the invention and, together with the description, serve to explain the principles of the invention.

DETAILED DESCRIPTION OF THE INVENTION

Figure 1:
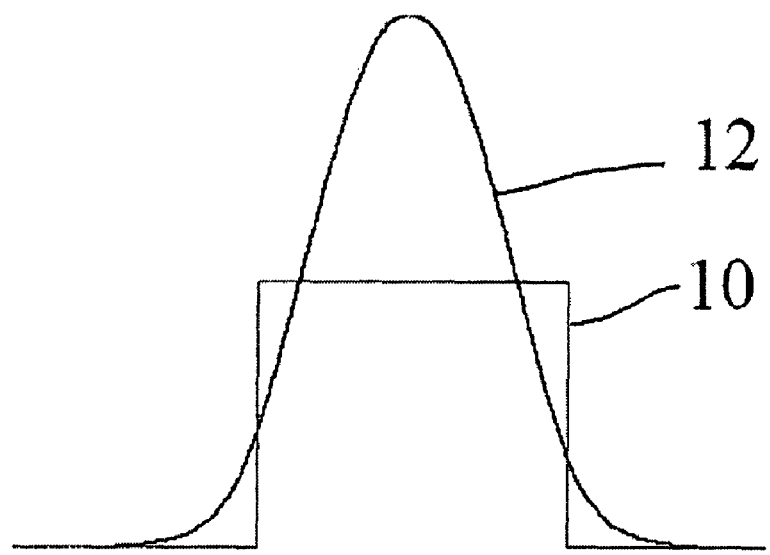
FIG. 1 shows a lineout through a cross section of an optical fiber showing the step index which defines the fiber core and the irradiance profile of the captured or waveguided radiation.
Figure 2A:
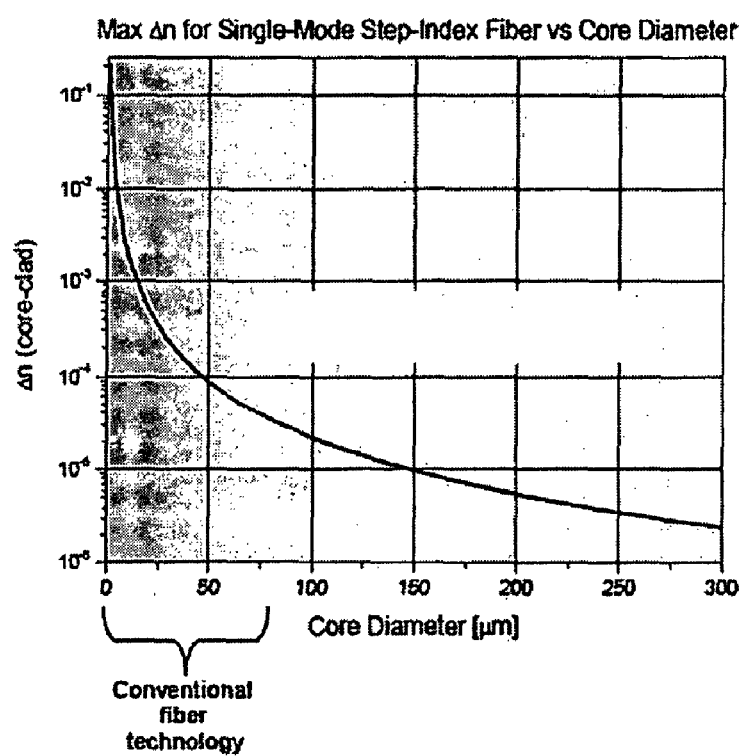
FIG. 2A shows the range of conventional fiber core diameters superimposed on a plot of the maximum value that $\Delta n$ can have as a function of core diameter and still guarantee that the fiber will only support single mode propagation.
Figure 2B:
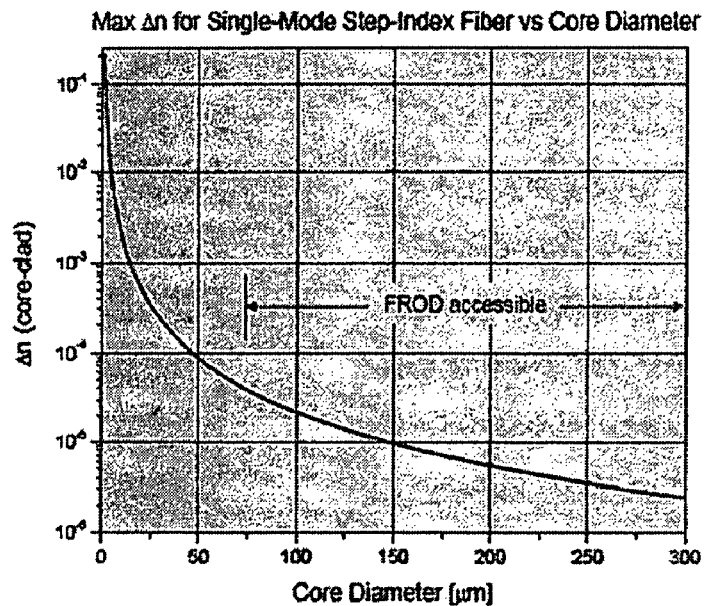
FIG. 2B shows the range of fiber core diameters of the present invention superimposed on a plot of the maximum value that $\Delta n$ can have as a function of core diameter and still guarantee that the fiber will only support single mode propagation.

The present invention surpasses the limits imposed by conventional fiber technologies by using a thermally generated waveguide rather than one fabricated directly into the waveguide material itself. Because fused silica has a positive dn/dT, when a fiber is pumped and heat is uniformly generated throughout the fiber's doped core, a parabolic temperature profile is naturally established with the center of the core the hottest and the perimeter the coolest. This leads to a refractive index gradient across the fiber that follows the temperature gradient, with the fiber core's center having the highest refractive index. Using the refractive index profile established by the temperature gradient in the fiber, it is then possible to guide radiation in exact analogy to conventional fibers where the step index structure does the guiding. The advantage with the thermal guiding approach is that now the waveguide can be constructed from a single homogeneous material, which can have a very uniform refractive index. Bulk fused silica, such as used in the manufacture of fiber performs, has refractive index uniformity better than $1 \times 10^{-6}$. Overlaying a thermally generated index profile on top of such a uniform starting material offers the possibility of index profiles that are smooth to the $10^{-6}$ level, which as seen in FIG. 2B, leads to the possibility of waveguide core diameters beyond 300 µm. An embodiment of the present invention comprises a uniformly doped fiber or rod that is pumped throughout its entire volume. Under steady state operating conditions the uniformly generated thermal power in such a round cross-sectioned rod leads to a parabolic temperature profile across the rod that naturally supports the self-similar propagation of a selected Gaussian cross-sectioned wave form. Physically, the waist of the Gaussian waveform is chosen such that the thermal lensing introduced by the parabolic temperature profile just compensates the diffraction of the beam as it propagates. Formally, propagation of the Gaussian beam can be described using ABCD matrices appropriate for a duct having a radial index grade. The ABCD matrix for such a duct is, $$\begin{pmatrix} A & B \\ C & D \end{pmatrix} = \begin{pmatrix} \cos(\gamma z) & \sin(\gamma z)/(n_0 \gamma) \\ -\sin(\gamma z) \cdot (n_0 \gamma) & \cos(\gamma z) \end{pmatrix}$$

where $$\gamma = \sqrt{n_2/n_0},$$

and $$n_2 = \frac{dn}{dT} \frac{P_{Th}'''}{2\kappa}$$

where $\kappa$ is the thermal conductivity of the fiber material and $P_{Th}'''$ is the thermally dissipated power density in the volume of the gain region.

The thermally generated radial index profile is described by $$n(r) = n_0 - \frac{1}{2} n_2 r^2.$$

Describing the laser beam by a complex radius of curvature, q, $$\frac{1}{q} = \frac{n_0}{R} - j \frac{\lambda_0}{\pi \omega^2}$$

where R is the radius of curvature and $\omega$ is the beam waist, leads to the following equation for the self-similar propagating mode, $$q = \frac{Aq + B}{Cq + D}.$$

The solution of the immediately preceding equation leads to an expression for $\omega$ and R, $$\omega^2 = \frac{\lambda_0}{\pi} \sqrt{\frac{2\kappa}{n_0 \frac{dn}{dT} P_{Th}'''}}, R = \infty,$$

which is the desired result, describing a collimated beam ($R=\infty$) propagating with a constant beam waist $\omega$.

The following design of a 1 m long FROD having a Yb doping density of $1 \times 10^{20}/cm^3$ is a specific example of the forgoing mathematical description. The assumed substrate material is glass and the core diameter is chosen to be 220 µm.

Figure 3:
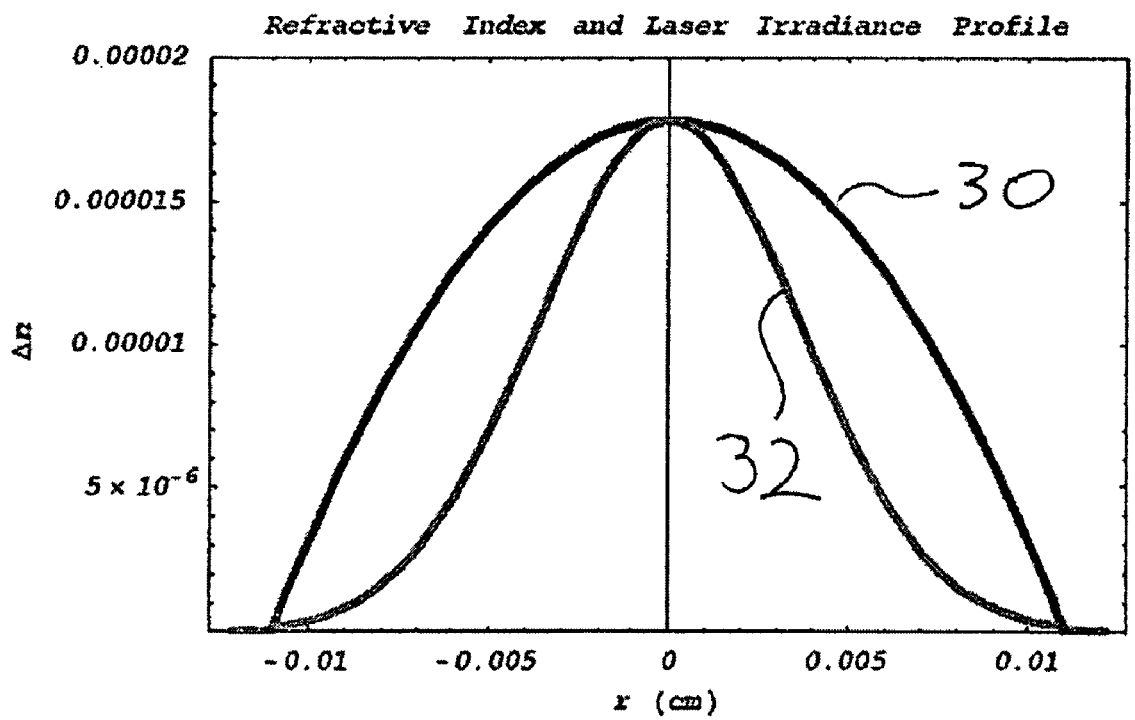
FIG. 3 shows both the shape of the index profile across the core and the supported Gaussian irradiance profile for a FROD.

In general, the material properties chosen in the following modeling are those of Yb$^{3+}$ doped into fused silica. Pumping at 940 nm and lasing at 1080 nm with 200 W of absorbed pump power leads to a specific thermal loading of 680 W/cm$^3$. FIG. 3 shows both the shape of the index profile across the core 30 and the supported Gaussian irradiance profile 32. The ω value (distance from the axis to the 1/e$^2$ irradiance value) that describes the Gaussian is 73 μm.

Figure 4:
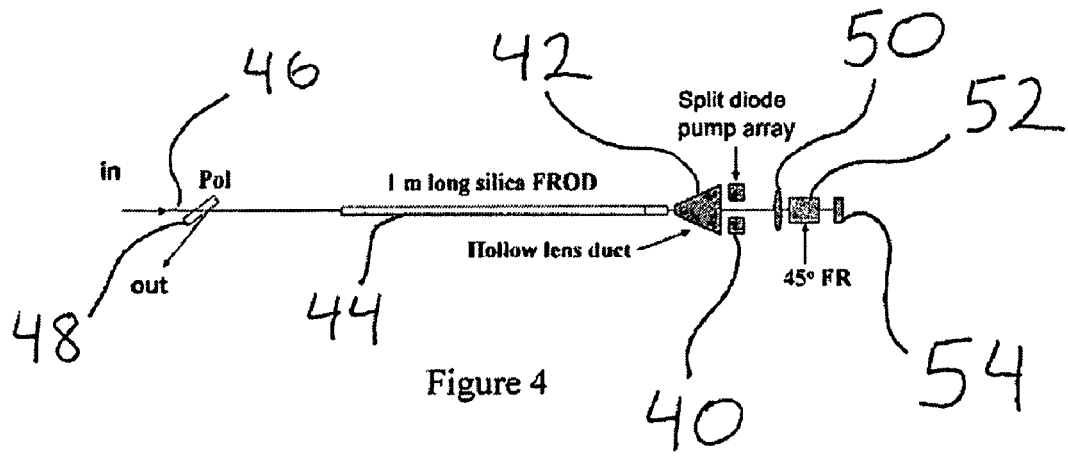
FIG. 4 shows a FROD in which a hollow lens duct and split diode array are used for pump excitation, and the laser pulse is double passed along the length of the FROD.

FIG. 4 shows one implementation of the FROD concept in which a split diode array 40 and hollow lens duct 42 are used to pump the 1 meter long silica fiber 44. An input beam 46, having a polarization that is parallel to the plane of the page, is directed through a beam splitter 48 that is oriented to allow such polarization to transmit. The beam 46 then propagates into the fiber at the end opposite to the pump beam entry end. After exiting the fiber at the pump beam entry end, beam 46 passes through the central opening in the lens duct 42 and the split diode array 40. Beam 46 then passes through a positive lens 50 and its polarization is rotated 45 degrees by a Faraday rotator 52 before being reflected by mirror 54 to return in the opposite direction. The polarization is rotated another 45 degrees and the beam passes again through the fiber 44, after which the beam reflects from beam splitter 48.

Figure 5:
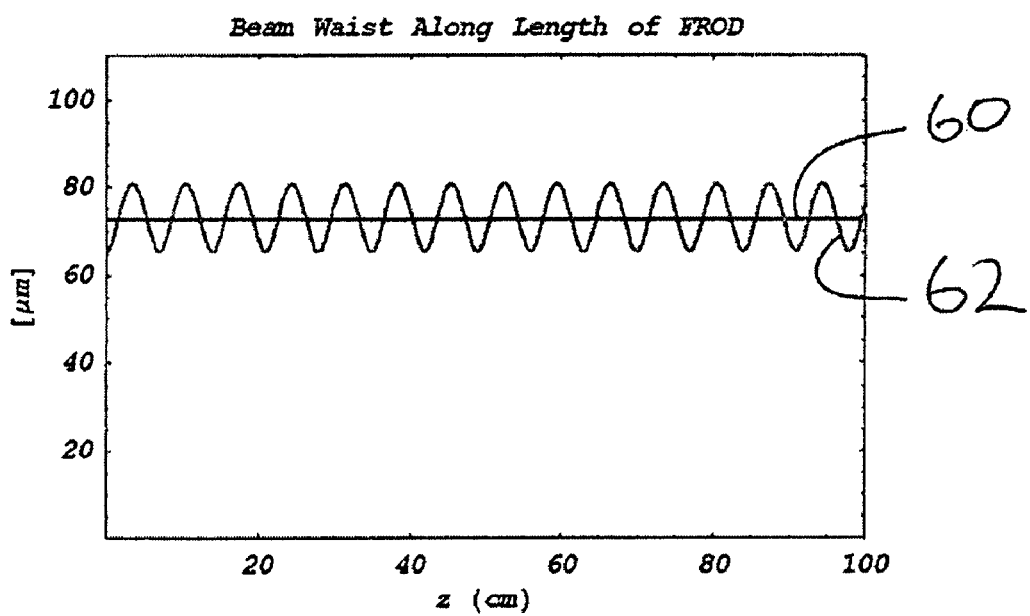
FIG. 5 shows beam propagation from left to right in a FROD with both an optimized beam waist beam and an input beam with waist 10% below the optimum value.

One of the nice features of the FROD is that the waveguide propagation via the thermally induced index gradient is perturbation stable. This means that if a slightly off optimum input beam is injected into the device it will still propagate in a stable manner with its beam waist oscillating around the optimum value. This is illustrated in FIG. 5, where both an optimized beam 60 and an off optimum beam 62 are injected into the left hand side of the FROD and propagated from left to right.

Another nice feature of the FROD is that it is polarization preserving to a high degree. For the FROD discussed in the text, the extent of thermally induced birefringence and the subsequent depolarization experienced by a beam in propagating along its length can be estimated. The following equation gives the depolarization in waves at a given radius r in the FROD after it has propagated a distance L along the length of the FROD, $$\text{Waves of birefringence} = (\Delta n_r - \Delta n_\varphi)\frac{L}{\lambda_0} = n_0^3 \frac{\alpha P''_{Th}}{\kappa} c_B r^2 \frac{L}{\lambda_0},$$

where $c_B$ is a dimensionless constant related to the photoelastic and opto-mechanical properties of the material used for the FROD's construction and that for fused silica has a value of −0.013, α is the linear coefficient of thermal expansion (0.55×10$^{-6}$/° C. for fused silica), and κ is the thermal conductivity (0.0138 W/cm-° C. for fused silica). Plugging into the above expression, the FROD modeled here is expected to have only 0.04 waves of depolarization at its outermost perimeter, r=110 μm. This is a value easily accommodated in most applications.

The FROD should be useful for laser amplification up to a diameter of ~300 μm. Beyond that diameter the concept of thermal waveguiding is still valid; however other physical processes come into play that can perturb the thermal waveguiding. This is easy to understand in terms of the magnitude of the index profile across the gain aperture at ~10$^{-6}$ when the diameter is 300 μm. The dominant perturbation of the thermal waveguide in this case is that due to gain guiding, which is analogous to thermal waveguiding except it is the imaginary part of the complex refractive index that is responsible for the physical guiding rather than the real part as in the case of thermal guiding. As a specific example consider a 1 m long FROD with a gain of 40 dB, corresponding to a specific gain α=9.2%/cm. This is on the high gain side of any practical FROD, and for a 1080 nm beam, contributes an imaginary part to the index given by $$\frac{\lambda_0 \alpha}{2\pi},$$

which for the case under consideration is 1.6×10$^{-6}$. If this imaginary index value were to be uniform across the gain aperture of the FROD, then it would have no impact on the waveguiding properties of the FROD, just adding to the background index. However, any useful FROD will have substantial gain saturation that peaks on the center of the FROD and diminishes toward the perimeter of the FROD where the Gaussian profile tapers off toward 0. This will tend to reshape the gain profile and will have to be considered in those cases where the thermal waveguiding is being accomplished with an index profile on the order of the imaginary gain induced index profile considered here.

Accordingly, an embodiment of the invention is an apparatus and a method for using the apparatus, where the apparatus comprises a core of rod shaped optical material comprising a positive dn/dT and a pump excitation source configured to establish a transverse thermal gradient in the rod. The core comprises a uniform and homogenous index of refraction. The structure may further comprise a lower refractive index optical material surrounding the core, wherein the pump excitation source is configured to input light into the lower refractive index optical material to establish the transverse thermal gradient in the rod. An outer coating may surround the lower refractive index optical material, wherein the outer coating comprises an index of refraction that is lower than that of the lower refractive index optical material. The rod may a laser gain media dopant, wherein the pump excitation source is further configured to generate gain in the core. Exemplary dopants may be selected from the group consisting of Nd$^{3+}$, Pm$^{3+}$, Sm$^{3+}$, Tb$^{3+}$, Dy$^{3+}$, Ho$^{3+}$, Er$^{3+}$, Tm$^{3+}$, Yb$^{3+}$ and Cr$^{3+}$. The rod may comprise a Raman gain media dopant. The core may comprise fused silica. The core may be characterized as having a parabolic temperature profile. The dopant is usually distributed substantially uniformly throughout the transverse thermal gradient. The transverse thermal gradient comprises a maximum index of refraction increase that will guarantee single mode operation, where a is the radius of the core, wherein the index of refraction increase, Δn, comprises a maximum value according to the following relation, $$\frac{2\pi}{\lambda_0} a\sqrt{2 \cdot n \cdot \Delta n} < 2.4.$$

The foregoing description of the invention has been presented for purposes of illustration and description and is not intended to be exhaustive or to limit the invention to the precise form disclosed. Many modifications and variations are possible in light of the above teaching. The embodiments disclosed were meant only to explain the principles of the invention and its practical application to thereby enable others skilled in the art to best use the invention in various embodiments and with various modifications suited to the particular use contemplated. The scope of the invention is to be defined by the following claims.

We claim:

1. An apparatus, comprising;
a core of rod shaped optical material comprising a positive dn/dT, wherein said rod shaped optical material consists essentially of a single homogenous material having no substantial variation in index of refraction; and
a pump excitation source configured for optically pumping via longitudinal excitation said core with pump light, wherein said longitudinal excitation establishes a transverse thermal gradient in said rod according to said positive dn/dT, wherein said transverse thermal gradient produces a distributed thermal lens that supports perturbation stable guided wave propagation of single or near single transverse mode laser light by balancing the diffractive nature of said laser light with the focusing power of said distributed thermal lens as said laser light propagates along its path.

2. The apparatus of claim 1, further comprising a lower refractive index optical material surrounding said core, wherein said pump excitation source is configured to input light into said lower refractive index optical material to establish said transverse thermal gradient in said rod.

3. The apparatus of claim 2, further comprising an outer coating surrounding said lower refractive index optical material, wherein said outer coating comprises an index of refraction that is lower than that of said lower refractive index optical material.

4. The apparatus of claim 1, wherein said rod comprises a laser gain media dopant, wherein said pump excitation source is further configured to generate gain in said core.

5. The apparatus of claim 4, wherein said dopant is selected from the group consisting of $Nd^{3+}$, $Pm^{3+}$, $Sm^{3+}$, $Tb^{3+}$, $Dy^{3+}$, $Ho^{3+}$, $Er^{3+}$, $Tm^{3+}$, $Yb^{3+}$ and $Cr^{3+}$.

6. The apparatus of claim 4, wherein said dopant is distributed substantially uniformly throughout said transverse thermal gradient.

7. The apparatus of claim 1, wherein said rod comprises a Raman gain media dopant.

8. The apparatus of claim 1, wherein said core comprises fused silica.

9. The apparatus of claim 1, wherein said core comprises a parabolic temperature profile.

10. The apparatus of claim 1, wherein said transverse thermal gradient comprises a maximum index of refraction increase that will guarantee single mode operation.

11. The apparatus of claim 10, where a is the radius of said core, wherein said index of refraction increase, $\Delta n$, comprises a maximum value according to the following relation, $$2\pi/\lambda_0 a\sqrt{2\cdot n\cdot\Delta n}<2.4.$$

12. The apparatus of claim 1, wherein the beam waist of said laser light as it propagates is dependent on both the thermal source through the volume of said rod and the material properties of said rod according to the equation $$\omega^2 = \frac{\lambda_0}{\pi}\sqrt{\frac{2\kappa}{n_0\frac{dn}{dT}P_{Th}'''}},$$

where $\omega$ is the beam waist of said laser light, $\kappa$ is the thermal conductivity of the material of said rod material, $\lambda_0$ is the vacuum wavelength of the laser light, $n_0$ is the refractive index of the rod material, dn/dT is the linear change of the refractive index of the rod material with temperature and $P_{Th}'''$ is the thermally dissipated power density.

13. A method, comprising;
providing a core of rod shaped optical material comprising a positive dn/dT, wherein said rod shaped optical material consists essentially of a single homogenous material having no substantial variation in index of refraction; and
optically pumping said core with pump light from a pump excitation source, wherein said pump light establishes a transverse thermal gradient in said rod according to said positive dn/dT, wherein said transverse thermal gradient produces a distributed thermal lens that supports perturbation stable guided wave propagation of single or near single transverse mode laser light by balancing the diffractive nature of said laser light with the focusing power of said distributed thermal lens as said laser light propagates along its path.

14. The method of claim 13, further comprising a lower refractive index optical material surrounding said core, wherein said pump excitation source is configured to input light into said lower refractive index optical material to establish said transverse thermal gradient in said rod.

15. The method of claim 14, further comprising an outer coating surrounding said lower refractive index optical material, wherein said outer coating comprises an index of refraction that is lower than that of said lower refractive index optical material.

16. The method of claim 13, wherein said rod comprises a laser gain media dopant, wherein said pump excitation source is further configured to generate gain in said core.

17. The method of claim 16, wherein said dopant is selected from the group consisting of $Nd^{3+}$, $Pm^{3+}$, $Sm^{3+}$, $Tb^{3+}$, $Dy^{3+}$, $Ho^{3+}$, $Er^{3+}$, $Tm^{3+}$, $Yb^{3+}$ and $Cr^{3+}$.

18. The method of claim 16, wherein said dopant is distributed substantially uniformly throughout said transverse thermal gradient.

19. The method of claim 13, wherein said rod comprises a Raman gain media dopant.

20. The method of claim 13, wherein said core comprises fused silica.

21. The method of claim 13, wherein said core comprises a parabolic temperature profile.

22. The method of claim 13, wherein said transverse thermal gradient comprises a maximum index of refraction increase that will guarantee single mode operation.

23. The method of claim 22, where a is the radius of said core, wherein said index of refraction increase, $\Delta n$, comprises a maximum value according to the following relation, $$2\pi/\lambda_0 a\sqrt{2\cdot n\cdot\Delta n}<2.4.$$

24. The method of claim 13, wherein the beam waist of said laser light as it propagates is dependent on both the thermal source through the volume of said rod and the material properties of said rod according to the equation $$\omega^2 = \frac{\lambda_0}{\pi}\sqrt{\frac{2\kappa}{n_0\frac{dn}{dT}P_{Th}'''}},$$

where $\omega$ is the beam waist of said laser light, $\kappa$ is the thermal conductivity of the material of said rod material, $\lambda_0$ is the vacuum wavelength of the laser light, $n_0$ is the refractive index of the rod material, dn/dT is the linear change of the refractive index of the rod material with temperature and $P_{Th}'''$ is the thermally dissipated power density.

* * * * *